US011455674B2

(12) United States Patent
Lundgaard

(10) Patent No.: US 11,455,674 B2
(45) Date of Patent: Sep. 27, 2022

(54) SYSTEMS AND METHODS OF ITEM SET GENERATION IN AN ELECTRONIC CATALOG

(71) Applicant: salesforce.com, inc., San Francisco, CA (US)

(72) Inventor: Keld Lundgaard, Cambridge, MA (US)

(73) Assignee: Salesforce, Inc., San Francisco, CA (US)

(*) Notice: Subject to any disclaimer, the term of this patent is extended or adjusted under 35 U.S.C. 154(b) by 407 days.

(21) Appl. No.: 16/742,954

(22) Filed: Jan. 15, 2020

(65) Prior Publication Data
US 2021/0110455 A1 Apr. 15, 2021

Related U.S. Application Data

(60) Provisional application No. 62/951,035, filed on Dec. 20, 2019, provisional application No. 62/914,579, filed on Oct. 14, 2019.

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0603* (2013.01)

(58) Field of Classification Search
CPC .................. G06Q 30/0625; G06Q 30/0603
See application file for complete search history.

(56) References Cited

U.S. PATENT DOCUMENTS

| 8,117,085 | B1* | 2/2012 | Smith | G06Q 30/0629 705/26.7 |
| 8,438,052 | B1* | 5/2013 | Chanda | G06Q 30/0207 705/7.11 |
| 2012/0158552 | A1* | 6/2012 | Smith | G06Q 30/0629 705/27.2 |
| 2017/0206281 | A1* | 7/2017 | Palmert | G06F 16/2282 |
| 2018/0152763 | A1* | 5/2018 | Barlaskar | G06Q 30/0255 |
| 2020/0236434 | A1* | 7/2020 | Sayyadi | H04N 21/44204 |

OTHER PUBLICATIONS

Kalloori, Saikishore, Francesco Ricci, and Marko Tkalcic. "Pairwise preferences based matrix factorization and nearest neighbor recommendation techniques." Proceedings of the 10th ACM Conference on Recommender Systems. 2016.*

* cited by examiner

Primary Examiner — Kathleen Palavecino
(74) Attorney, Agent, or Firm — Butzel Long

(57) ABSTRACT

Systems and methods are provided for determining pairwise scores for items in an electronic catalog that is stored in a storage device communicatively coupled to a server, and determining when a pair of items in the electronic catalog is valid. A sum of the pairwise scores by activity type for a plurality of activity types may be determined, and the pairwise scores for the plurality of activity types may be summed. A sorted list of items that compliment an anchor item of the electronic catalog may be generated. Items from the generated sorted list may be filtered, and an item ranking in the filtered list may adjusted. Consistency between recommendations of the items in the adjusted ranking list may be determined, final recommendations of the items based on the determined consistency between recommendations may be selected and transmitted for display.

18 Claims, 7 Drawing Sheets

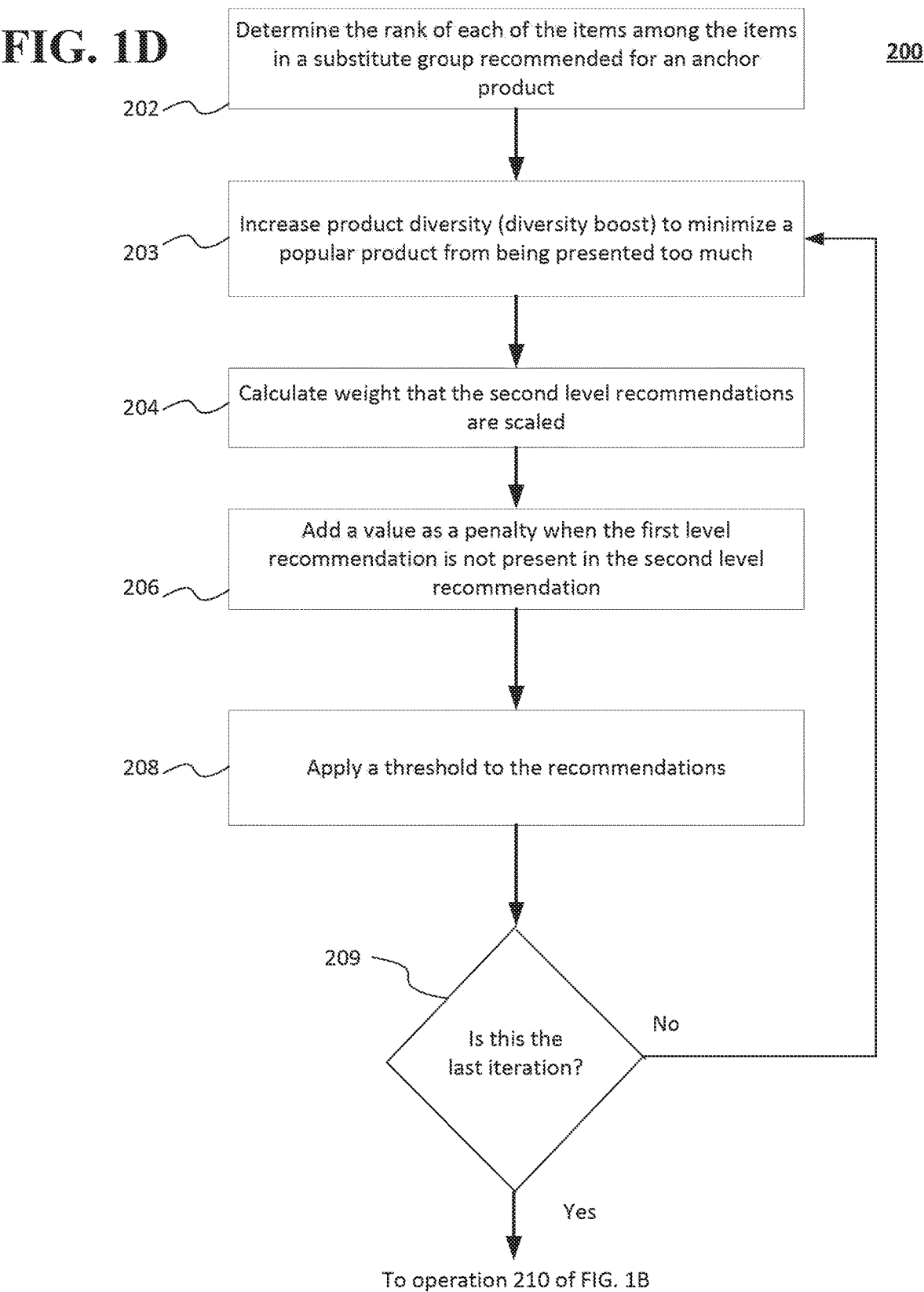

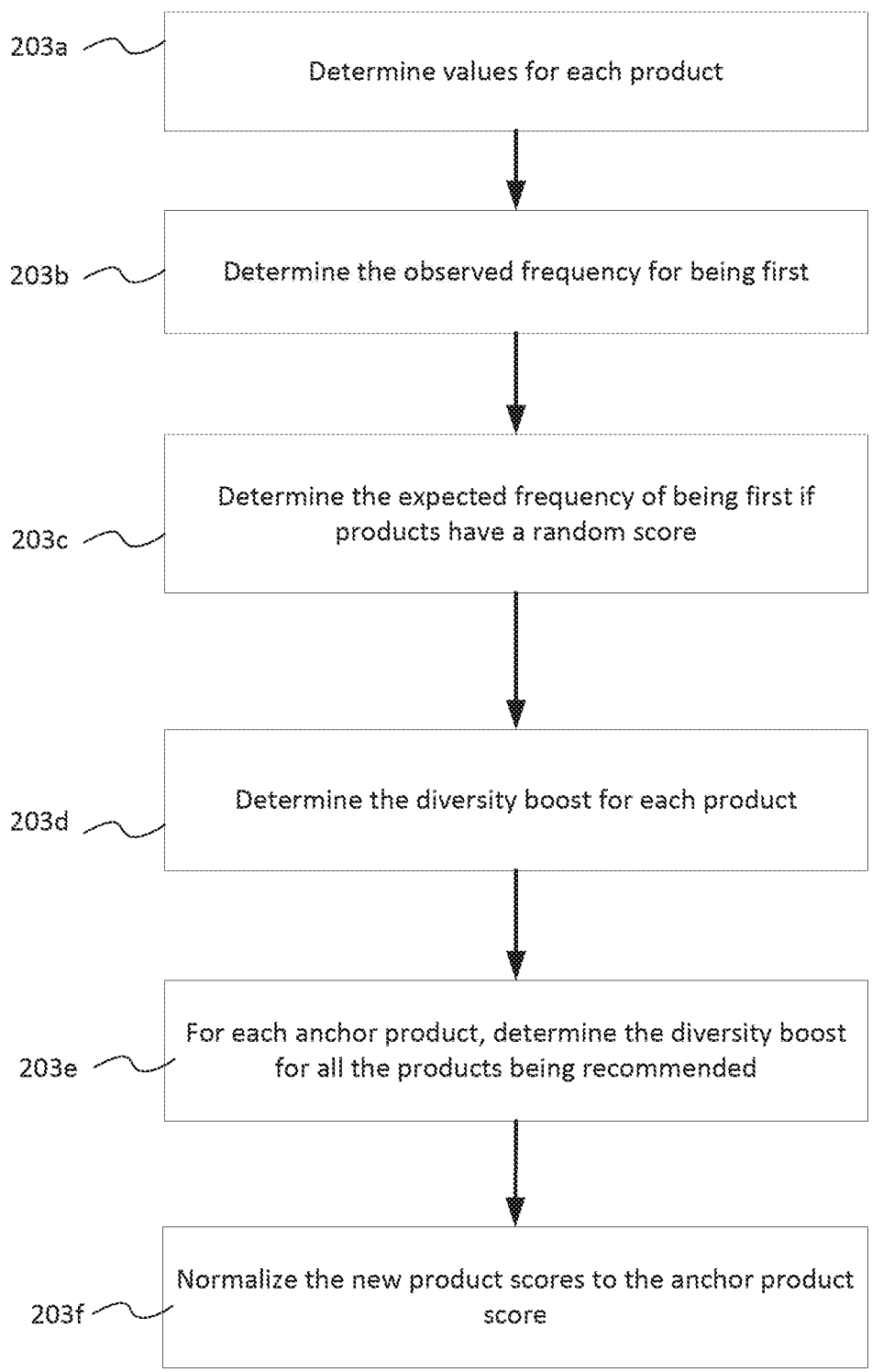

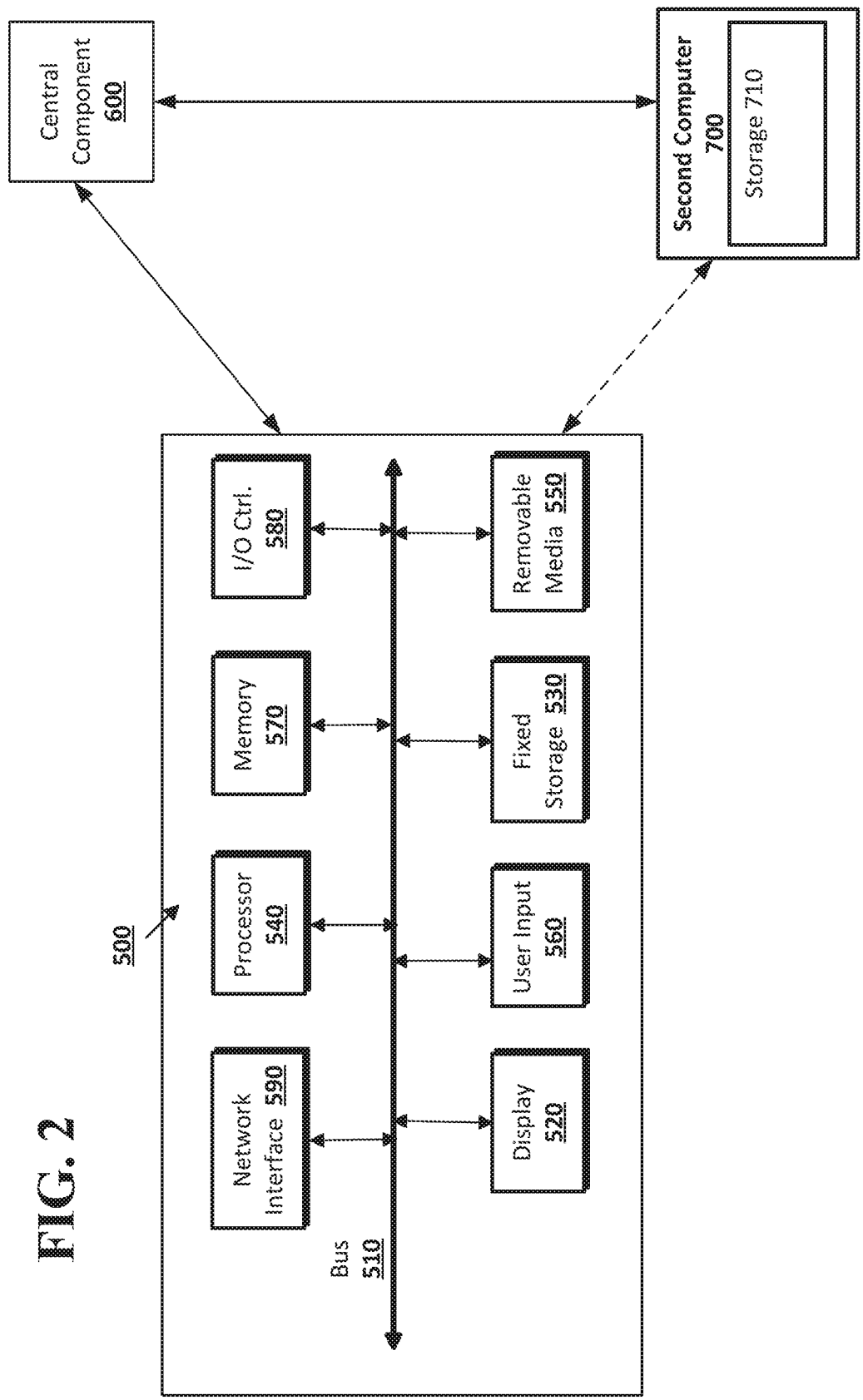

SYSTEMS AND METHODS OF ITEM SET GENERATION IN AN ELECTRONIC CATALOG

CROSS-REFERENCE TO RELATED APPLICATIONS

This application claims priority to U.S. Application Ser. No. 62/951,035, filed Dec. 20, 2019 and U.S. Application Ser. No. 62/914,579, filed Oct. 14, 2019, the disclosures of which are incorporated by reference in their entirety.

BACKGROUND

Current systems provide electronic catalogs, such as via a web page, which display available products to a user. When a user searches for a product using a search query, products of the same type that match the search query are displayed for the user. In some current systems, a selected product in the electronic catalog can be displayed along with other products that are the same type of product.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1A-1E show example methods of grouping items into sets and generating item recommendations according to implementations of the disclosed subject matter.

FIG. 2 shows a computer system according to an implementation of the disclosed subject matter.

DETAILED DESCRIPTION

Figure 1A:
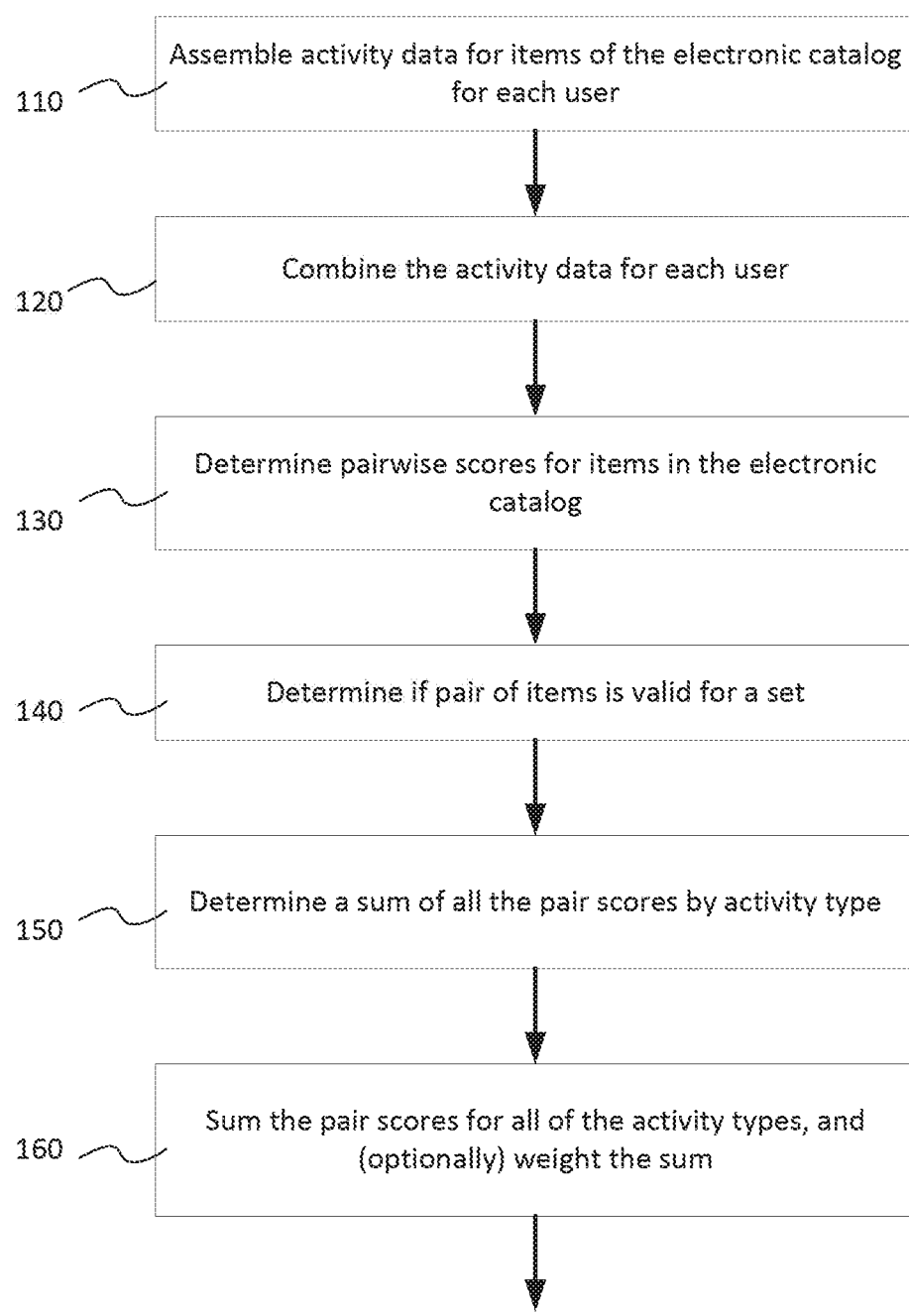

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods of providing item (product) recommendations for a user of an electronic catalog, where the recommended items may be complimentary and/or different types of items. The recommendations may be based, in part, on one or more selections and/or purchases by users of one or more items from the electronic catalog. The selections may be items viewed, added to an electronic shopping cart, and/or purchased by the user.

When a user selects an item in the electronic catalog, and/or searches for an item in the electronic catalog, implementations of the disclosed subject matter may determine other items to be displayed to the user as a set of items. That is, the determined set of items to be displayed may include the selected item, related items of the same item type, and/or complimentary items that are of a different type of item. For example, if the user is searching for and/or has selected a shirt in the electronic catalog, implementations of the disclosed subject matter may provide recommendations of pants, shoes, a hat, or the like that may be paired with the shirt. The implementations of the disclosed subject matter form a set of items that may be of different types to present to the user based on the user's selection of the shirt from the electronic catalog. That is, the implementations of the disclosed subject matter may complete a set of items to be presented to the user, in addition to an initially selected item and/or the search results for an item.

Implementations of the disclosed subject matter may determine different co-purchase behaviors, and determine sets of items from the co-purchasing behavior. For example, one or more users of the electronic catalog may purchase a plurality of sweaters, but the implementations of the disclosed subject matter may not automatically place these sweaters in a set together. Implementations of the disclosed subject matter may determine that the sweaters are substitutes for one another. Continuing the example, the user may purchase a hat along with the plurality of sweaters. Implementations of the disclosed subject matter may determine that the hat may be grouped with one or more of the plurality of sweaters in a set. Further continuing the example, implementations of the disclosed subject matter may add other items to the set including the sweaters and the hat, and may present the set of items (which may be of different types) to the user.

Implementations of the disclosed subject matter provide sets of items that may be of a different type that a user may consider for purchase together. This may reduce the time and complexity of a user navigating and/or searching an electronic catalog for desired items, and assists a user in coordinating items that may be of a different item type. Implementations of the disclosed subject matter may recommend items that a user may not consider and/or typically seek out in the electronic catalog. That is, in implementations of the disclosed subject matter, more purposeful electronic catalog content may be delivered to a user before the user's interaction with the electronic catalog is over because the user cannot find a desired item, the user just purchases the item that they were seeking, and/or the user does not consider other items (e.g., substitute items and/or complimentary items) before exiting the electronic catalog. The grouping of items into sets may improve the performance for item recommendations. In some implementations, item diversity may be increased to minimize a popular item from being presented too much in the set of item recommendations.

Figure 1B:
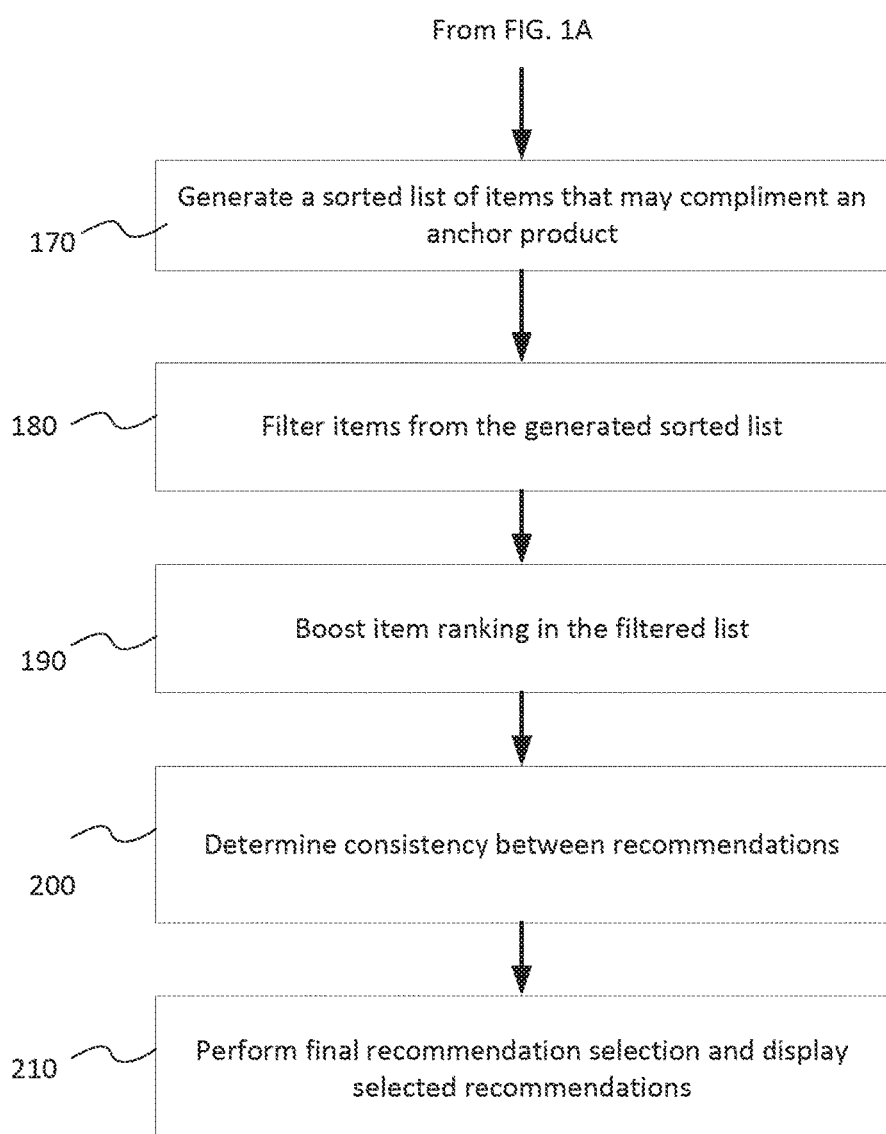
Figure 1C:
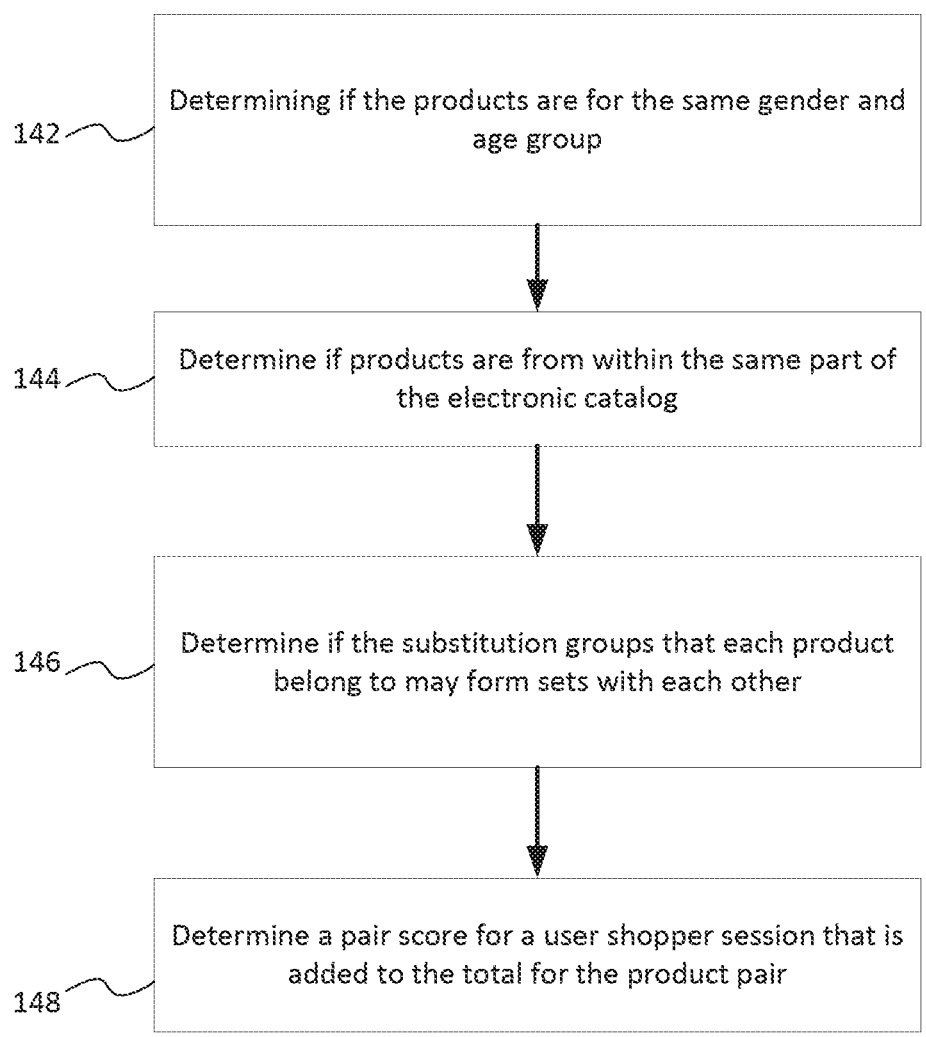

FIGS. 1A-1E show example methods of grouping items into sets and generating item recommendations according to implementations of the disclosed subject matter. FIGS. 1A-1B show an example method 100, where a server (e.g., computer 500, central component 600 and/or second computer 700 shown in FIG. 2) may assemble and/or collect activity data of at operation 110. In some implementations, the assembled and/or collected activity data may be stored in a storage device (e.g., fixed storage 530 of computer 500, central component 600, storage 710 shown in FIG. 2, and/or database systems 1200a-d shown in FIG. 3). The activity data may include, for example, any items added to an electronic shopping basket by one or more users from the electronic catalog, and/or any items purchased by the one or more users from the electronic shopping basket.

In some implementations, the server may group the activity data for each user by session. The session may be a predetermined length of time, such as 1 hour, 5 hours, 12 hours, 1 day, 5 days, 1 week, 2 weeks, or the like. The server may determine the number of unique items that were interacted with, where the interaction may include adding the item to the electronic shopping basket, purchasing the item, viewing the item, adding the item to a list of future items to be purchased and/or wish list, or the like.

The server may combine the activity data at operation 120 for each user in one or more time segments. The time segments may include, for example, a single activity (e.g., an electronic shopping basket checkout, where the items in the basket are purchased), 1 day, 6 days, 14 days, or the like. The server may combine a portion of or all of the activity data over one or more of the predetermined time segment. In some implementations, the server may de-duplicate the combined activity data, so that a set of items is counted once for each user.

In some implementations, the server may combine the activity data over different predetermined periods of time. For example, if the user purchased a sweater from the electronic catalog one day, and subsequently purchased a hat two days later, the server may pair the purchase of the hat and the sweater.

That is, at operation 120, the server may combine the activity data determined at operation 110 for each user, where the server generates a list of items that each user has interacted with over a predetermined period of time.

For each interaction session over a predetermined period of time (e.g., at checkout, 1 day, 1 week, or the like), the server may determine the different items that the user interacted with, and create pairwise scores at operation 130. In some implementations, the server may determine pairwise scores for items in an electronic catalog that is stored in a storage device (e.g., fixed storage 530 of computer 500, central component 600, storage 710 shown in FIG. 2, and/or database systems 1200*a-d*) communicatively coupled to the server. The server may discount (i.e., reduce) pairwise scores by the number of possible permutations between each item substitution group. As used throughout, an item substitution group may be items and/or items that are used for the same purpose. For example, t-shirts and tops may be in one item substitution group, and jeans may be in another item substitution group. Outfits may include items from different substitution groups.

One or more of the item substitution groups may be partial substitutes. In some implementations, the server may not create item substitution groups having partial substitutes. In some implementations, the server may form sets between the item substitution groups having partial substitutes. For example, the server may assign a winter overall and/or one piece snowsuit as a substitute for both winter pants and a winter jacket.

Within each session, the server may perform a comparison operation. For each pair of items, the server may determine if a pair of items is valid for a set at operation 140. The details of operation 140 may be shown in FIG. 1B. At operation 142, the server may determine if the items are for the same gender and age group. At operation 144, the server may determine if the items are from within the same part of the electronic catalog that may be allowed to form sets. For example, one or more rule sets followed by the server may have brands of items separated out, such that they do not interleave. At operation 146, the server may determine if the substitution groups that each item belong to are allowed to form sets with each other under one or more rules followed by the server. If the pair passes the checks in operations 142, 144, and 146, the server may generate a pair score for this session at operation 148, which may be added to the total for the item pair. That is, in operation 148, the pair score may be determined for a user shopper session that is added to a total score for the items of the pair, where the total score may be used to determine whether the pair of items is valid based on a predetermined validity score.

In some implementations, the pair score generated by the server may adjust the number of pairings that may be made between the two substitution groups. For example, if there are N items of substitute group 1 (e.g., shirts) and M items of substitute group 2 (e.g., jeans), then the score for the pair in the session may be $1/(N*)^a$, where a is an adjustable exponent. The exponent a may have a value of 1.1, 1.2, 1.3, 1.4, 1.5, 1.6, 1.7, or any other suitable value. Continuing this example, if there are 2 shirts and 3 pairs of jeans in the session, the server may determine that the pair score between each of the jeans and shirts may be $1/(2*3)^{1.5}=0.07$. If there were 2 shirts and 1 pair of jeans, the value may be 0.35 (i.e., $(½*1)^{1.5}=0.35$). At operation 150 shown in FIG. 1A, the server may calculate sums for all the pair scores of the sessions. That is, at operation 150, a sum of the pairwise scores may be determined by activity type for the plurality of activity types.

At operation 160, the server may sum the determined pair scores for one or more types of activities (e.g., "add to basket" events, "finish checkout" events, and the like). In some implementations, the server may sum up these scores, and may weight the sum. For example, the pair scores for the events for adding one or more items to the electronic shopping basket (i.e., "add to basket" events) and purchasing items at checkout (i.e., "finish checkout") may be weighted with the value of 0.3 on "add to basket" sessions and 1.0 on "finish checkout". In some implementations, other weighting values may be used. For example, the values 0.1, 0.2, 0.4, 0.5, or the like may be used on "add to basket" sessions, and 1.0, 2.0, 3.0, 4.0, or the like may be used on "finish checkout" sessions.

For each item (i.e., an anchor item), the server may generate a sorted list of items that may compliment the anchor item by using the pair scores at operation 170 shown in FIG. 1B.

The server may filter items from the generated sorted list of items at operation 180. For example, the server may filter out items that may not be recommended, such as items that are not presently available (i.e., out of stock items).

At operation 190, the server may adjust items (i.e., "boost" a ranking of an item) in the filtered and sorted list (i.e., elevate an item in the sorted list of items so that it appears higher in the list). In some implementations, the server may boost one or more items. For example, if shoes are determined by the server as important in sets, the server may boost the scores of shoes by multiplying the scores of shoes that are recommended by a predetermined value. For example, the scores of the shoes may be multiplied by 1.3, 1.8, 2, 2.5, 3, 4, or any other suitable value. In some implementations, the server may boost one or more substitute groups (i.e., pair-substitute boosting). For example, the server may boost a pants substitute group when the anchor item is a shirt.

In some implementations, the server may apply a boosting to an item based on price. The server may calculate the mean price for the one or more items being recommended to the anchor item (i.e., price_mean). For each item recommended based on the anchor item, the server may update the score to score_new=score_old*(price/price_mean)^price_power. For example, the price_power (which may be the weighting and/or boosting value) may be 0.1, 0.2, 0.5, 0.7, or the like. In this implementation, more costly items may be recommended before less expensive ones. In some implementations, the price_power may be adjusted so that less expensive items are recommended before more costly ones.

At operation 200, the server may determine whether the recommendations given to an individual item (i.e., an anchor item) are consistent. That is, the server may determine the consistency between recommendations of the items in the adjusted ranking list. The server may set the recommendations between the different items so that they agree with one another. For example, the server may set recommendations such that the set of recommended items may be the same, whether the user views a sweater, pants, or shoes individually within the electronic catalog and receives recommendations.

Operation 200 is shown in more detail in FIG. 1D. In some implementations, the operations 204, 206, 208, and 209 shown in FIG. 1D as part of operation 200 may be repeated. For example, the server may repeat operations 206, 208, and 209 two times, three times, four times, five times, or the like.

At operation 202, the server may determine the rank of each of the items among the items in a substitute group recommended for an anchor item. For example, if there are three pairs of jeans that may be recommended for the anchor item, the server may assign the ranks to them (e.g., ranks 1, 2, and 3) based on the scores of each of them, with the jeans with the highest score being assigned rank 1. In some implementations, if there is a tie between two item cores, the server may break ties by random selection, and/or any other suitable method.

The server may determine the new score (i.e., the updated score) of each item recommendation, where the new score is: score_new=score_old/log$_2$(rank+1). That is, the item that does not have the highest score may have its score reduced.

At operation 203, implementations of the disclosed subject matter may increase item diversity (i.e., diversity boost) to minimize a popular item from being presented too much in a set of recommended items (i.e., minimize a popular item from dominating a set of recommended items). Operation 203 is shown in detail in FIG. 1E. At operation 203a, values for each item may be determined, where slot_count may be the number of items within each slot (e.g., an assignment for a particular item and/or group of items), slot_shown may be the number of times a slot was shown over all the anchor items (e.g., in some implementations, the slot may be shown once per anchor item), and slot_pid_first, which may be the number of times a given item identifier (product id, which may also be referred to as "pid") was ranked highest within its slot across all anchor items.

At operation 203b, the observed frequency (obs_freq) for being first (i.e., ranked highest within a slot) may be determined, where obs_freq=slot_pid_first/slot_shown. At operation 203c, the expected frequency of being first (i.e., ranked highest within a slot) if items had random score may be determined, where rand_freq=1/slot_count.

At operation 203d, the diversity boost for each item may be determined, where boost[pid]=1./2^(boost_power*(obs_freq−rand_freq)/rand_freq). In some implementations, the boost_power=0.5. In some implementations, the boost value may have a minimum value of 0.1 and a maximum value of 10.

At operation 203e, for each anchor item, the diversity boost may be determined for all the items being recommended. In some implementations, the diversity boost may be determined by performing a lookup of the boost [pid].

At operation 203f, the new item scores may be normalized to the score of the anchor item such that the sum of the scores before and after diversity boosting is the same. In some implementations, each score may be multiplied with score_before/score_after. That is, operation 203 may reshuffle the scores between items.

In some implementations, the diversity boosting of operation 203 (e.g., operations 203a-203f) may be performed on the second and third rounds, where a round may be the iteration number of the operations 203, 204, 206, 208, and 209 shown in FIG. 1D, and described in detail below.

For each of the recommended items for the anchor item, the server may calculate t weight that the second level recommendations may be scaled by at operation 204 shown in FIG. 1D. In some implementations, this weight scaling power may be calculated as: weight=factor*rounds_decay^round*rec_score. The factor may be a predetermined numerical value, such as 0.25, 0.50, 0.75, or the like. The rounds_decay may be a predetermined value such as 0.25, 0.50, 0.75, or the like. The rounds_decay may make the weight decay for every round. For example, for round 0, the rounds_decay will be 1 (0.75**0=1), for round 1, the rounds_decay may be 0.75, for round 2, the rounds_decay may be (0.75*0.75)=0.5625, and the like. That is, the weight may decrease from round to round. The round may be the iteration number of the operations 204, 206, 208, and 209 shown in FIG. 1D. The number of rounds (i.e., iterations of operations 204, 206, 208, and 209 shown in FIG. 1D), may be a value such as 2, 3, 4, 5, 6, 7, or the like.

In some implementations, the server may add a weighting by the substitute group rank again, in addition to the previous weight.

The server may use the recommendations of each of the recommendations (i.e., the second level recommendations), and add each of the second level recommendations to the score for the first level anchor by the following: weight*score_2nd/sum(scores_2nd). That is, the server may add second level recommendations for pairings of items that are not substitutes, so that the item does not recommend itself.

At operation 206, the server may add a penalty (i.e., a constant value and/or factor) when the first level recommendation is not present in the second level recommendations. For example, the factor may be 0.1, 0.2, 0.3, 0.4, 0.5, 0.6, or the like.

At operation 208, the server may user a threshold minimum score (e.g., a minimum score of 1), and may provide a limit of the number of items recommended to an anchor item. For example, the server may allow up to 100 items to be recommended for the anchor item.

At operation 209, the server may determine whether this is the last iteration. If this is not the last iteration, the server may perform operation 203 again. Otherwise, the iterations may be terminated, and the recommendations may be displayed to the user (e.g., on display 520 of computing device 500 shown in FIG. 2) as part of operation 210 in FIG. 1B. That is, the server may determine whether the predetermined number of rounds (e.g., 5 rounds) have been completed at operation 209, and either continues iterating the operation, or proceeds to operation 210 if the predetermined number of rounds have been reached.

At operation 210 shown in FIG. 1B, the server may select the recommendations for each substitute groups. The server may determine that there no recommended items that are substitutes to items already selected. That is, the server may determine whether there may be a substitute for the ranking items (e.g., starting from the highest-scoring item). If the server determines that there is not a substitute to any of the items already selected, the item may be added to the list of selected items to recommend in the set.

The server may determine that the item is not a substitute to items that are already selected by adding to a set of all slots to be a substitute to already-selected items. That is, if the server determines that an item belongs to a substitute group that in the disallowed substitute groups, then it is skipped, and the next item (i.e., that has a lower score) may be considered by the server for selection.

In some implementations, the server may determine whether there is a misalignment with attributes for previous items. For example, the server may determine whether the items to be recommended are suitable based on age, gender, or the like.

When the server has determined the final sets of items in operation 210, the server may transmit the list of recommended items to a computing device (e.g., computer 500 shown in FIG. 2) to be displayed on a display device (e.g., display 520).

Implementations of the presently disclosed subject matter may be implemented in and used with a variety of component and network architectures. FIG. 2 is an example computer 500 suitable for implementing implementations of the presently disclosed subject matter. As discussed in further detail herein, the computer 500 may be a single computer in a network of multiple computers. In some implementations, the computer 500 may be used to select an item in a displayed item catalog or from a results list from an item catalog search, display the item along with determined item pairings, and/or receive a selection to purchase an item or paired items. As shown in FIG. 2, the computer 500 may communicate with a central or distributed component 600 (e.g., server, cloud server, database, cluster, application server, neural network system, or the like).

The central component 600 may communicate with one or more other computers such as the second computer 700, which may include a storage device 710. The second computer 700 may be a server, cloud server, neural network system, or the like. Central component 600 and/or the second computer 700 may determine what item purchases have been made by users, determine what purchases were made over a predetermined period of time (e.g., 1 day, 6 days, 14 days, 1 month, or the like), pair items together to be displayed to a user, determine whether item pairings are consistent, and the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. In some implementations, the storage 710 may store the catalog information, item data, machine learning model data, label data, and the like.

Figure 3:
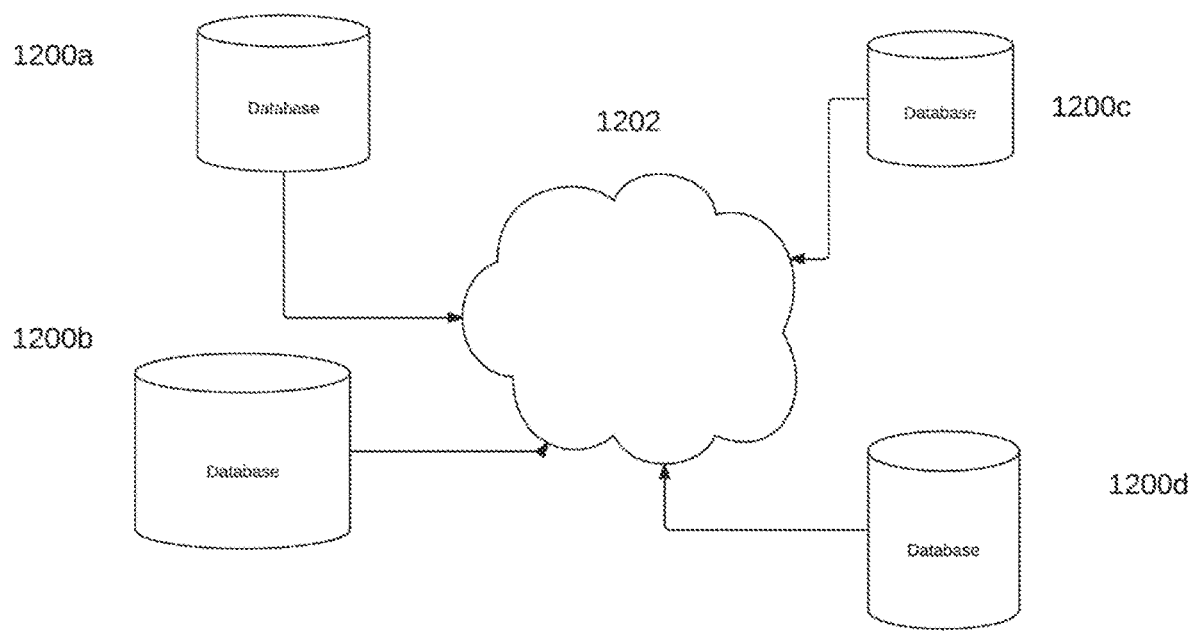
FIG. 3 shows a network configuration according to an implementation of the disclosed subject matter.

Further, if the systems shown in FIGS. 2-3 are multitenant systems, the storage can be organized into separate log structured merge trees for each instance of a database for a tenant. Different tenant may store different item catalog data, item data, label data, and the like. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with computer 400 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 2-3.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 2-3 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 3 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may, for example, store catalog information, item data, item type data, item purchase data, item viewing data, item pairing data, and the like. In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 2. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier. The tenant data may include, for example, catalog information, product data, machine learning model data, label data, and the like.

In some implementations, the one or more servers shown in FIGS. 2-3 can store the data in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data, replication configuration profiles, and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "assembling," "combining," "determining," "summing," "generating," "filtering," "boosting," "determining," "performing," "calculating," "adding," "applying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
 determining, at a server, pairwise scores for items in an electronic catalog that is stored in a storage device communicatively coupled to the server;
 determining, at the server, when a pair of items in the electronic catalog is valid by:
  determining substitution groups based on the pair of items;
  determining that the substitution groups that each item belongs to form sets with each other;
 determining, at the server, a sum of the pairwise scores by activity type for a plurality of activity types;
 summing, at the server, the pairwise scores for the plurality of activity types;
 generating, at the server, a sorted list of items that compliment an anchor item of the electronic catalog;
 filtering, at the server, items from the generated sorted list;
 adjusting, at the server, an item ranking in the filtered list;
 determining, at the server, consistency between recommendations of the items in the adjusted ranking list; and
 selecting, at the server, final recommendations of the items based on the determined consistency between recommendations, and transmitting the selected recommendations for display.

2. The method of claim 1, wherein the determining the pairwise scores further comprises:
 assembling, at the server, activity data for items of the electronic catalog for each user;
 combining, at the server, the activity data for each user; and
 determining, at the server, the pairwise scores for the items in the electronic catalog based on the combined activity data.

3. The method of claim 2, further comprising:
 de-duplicating, at the server, the combined activity data so that a set of items is counted once for each user.

4. The method of claim 2, wherein the combining of the activity data by the server is for a predetermined period of time.

5. The method of claim 1, wherein the summing the pair scores further comprises weighting, at the server, the sum of the pair scores.

6. The method of claim 1, wherein the determining when the pair of items is valid for the set comprises:
 determining, at the server, when the items of the pair are for a same gender and age group;
 determining, at the server, when the items of the pair are from within a same part of the electronic catalog; and
 determining, at the server, a pair score for a user shopper session that is added to a total score for the items of the pair, wherein the total score is used to determine whether the pair of items is valid based on a predetermined validity score.

7. The method of claim 1, wherein the recommendations include a first level recommendation and a second level recommendation, and wherein the determining the consistency between recommendations comprises:
 determining, at the server, the rank of each of the items among the items in a substitute group recommended for the anchor item of the electronic catalog;
 determining, at the server, an increase in item diversity for each of the items;
 calculating, at the server, a weight that the second level recommendation is scaled;
 adding, at the server, a value as a penalty when the first level recommendation is not present in the second level recommendation; and
 applying, at the server, a threshold to the recommendations.

8. The method of claim 7, wherein the applied threshold sets the number of items recommended for the anchor item.

9. The method of claim 7, wherein the determining the increase in item diversity for each of the items comprises:
 determining, at the server, an observed frequency for each of the items to be a first recommended item;
 determining, at the server, an expected frequency of being first when each of the items has a random score;
 determining, at the server, a diversity boost for each of the items;
 determining, at the server, for each anchor item, the diversity boost for all the items to be recommended; and
 normalizing, at the server, the new item scores to an anchor item score.

10. A system comprising:
 a storage device; and
 a server including a hardware processor and a memory, communicatively coupled to the storage device, to:
  determine pairwise scores for items in an electronic catalog that is stored in the storage device;
  determine when a pair of items in the electronic catalog is valid by determining substitution groups based on the pair of items, and determining that the substitution groups that each item belongs to form sets with each other;
  determine a sum of the pairwise scores by activity type for a plurality of activity types;
  sum the pairwise scores for the plurality of activity types;
  generate a sorted list of items that compliment an anchor item of the electronic catalog;
  filter items from the generated sorted list;
  adjust an item ranking in the filtered list;
  determine consistency between recommendations of the items in the adjusted ranking list; and
  select final recommendations of the items based on the determined consistency between recommendations, and transmit the selected recommendations for display.

11. The system of claim 10, wherein the server determines the pairwise scores by assembling activity data for items of the electronic catalog for each user, combining the activity data for each user, and determining the pairwise scores for the items in the electronic catalog based on the combined activity data.

12. The system of claim 11, wherein the server de-duplicates the combined activity data so that a set of items is counted once for each user.

13. The system of claim 11, wherein the combining of the activity data by the server is for a predetermined period of time.

14. The system of claim 10, wherein the summing the pair scores further comprises weighting the sum of the pair scores.

15. The system of claim 10, wherein the server determines when the pair of items is valid for the set by determining when the items of the pair are for a same gender and age group, determining when the items of the pair are from within a same part of the electronic catalog, and determining a pair score for a user shopper session that is added to a total score for the items of the pair, wherein the total score is used to determine whether the pair of items is valid based on a predetermined validity score.

16. The system of claim 10, wherein the recommendations include a first level recommendation and a second level recommendation, and
wherein the server determines the consistency between recommendations by determining the rank of each of the items among the items in a substitute group recommended for the anchor item of the electronic catalog, determining an increase in item diversity for each of the items, calculating a weight that the second level recommendation is scaled, adding a value as a penalty when the first level recommendation is not present in the second level recommendation, and applying a threshold to the recommendations.

17. The system of claim 16, wherein the applied threshold sets the number of items recommended for the anchor item.

18. The system of claim 16, wherein the server determines the increase in item diversity for each of the items by determining an observed frequency for each of the items to be a first recommended item, determining an expected frequency of being first when each of the items has a random score, determining a diversity boost for each of the items, determining for each anchor item, the diversity boost for all the items to be recommended, and normalizing the new item scores to an anchor item score.

* * * * *